United States Patent
Miwa et al.

(10) Patent No.: US 9,061,871 B2
(45) Date of Patent: Jun. 23, 2015

(54) MAST ASSEMBLY FOR FORKLIFT TRUCK (75) Inventors: Takaaki Miwa, Kanagawa (JP); Shinya Nishimura, Kanagawa (JP); Nobuyuki Inomata, Kanagawa (JP)

(73) Assignee: Oiles Corporation, Tokyo (JP)

( * ) Notice: Subject to any disclaimer, the term of this patent is extended or adjusted under 35 U.S.C. 154(b) by 205 days.

(21) Appl. No.: 13/817,642

(22) PCT Filed: Apr. 12, 2011

(86) PCT No.: PCT/JP2011/002145
§ 371 (c)(1),
(2), (4) Date: Feb. 19, 2013

(87) PCT Pub. No.: WO2012/029206
PCT Pub. Date: Mar. 8, 2012

(65) Prior Publication Data
US 2013/0146396 A1    Jun. 13, 2013

(30) Foreign Application Priority Data
Sep. 1, 2010    (JP) .................................. 2010-195819

(51) Int. Cl.
*B66F 9/08*    (2006.01)
*F16C 29/02*    (2006.01)

(52) U.S. Cl.
CPC .. *B66F 9/08* (2013.01); *F16C 29/02* (2013.01)

(58) Field of Classification Search
CPC ........................................................ B66F 9/08
USPC ................... 187/230, 226; 384/13, 27, 35, 42
See application file for complete search history.

(56) References Cited

U.S. PATENT DOCUMENTS

| 2,106,878 | A | * | 2/1938 | Sinclair | .......................... 187/225 |
| 3,032,377 | A | * | 5/1962 | Gunter | ............................ 187/409 |
| 3,433,324 | A | * | 3/1969 | McIntosh | ...................... 187/222 |

(Continued)

FOREIGN PATENT DOCUMENTS

| CA | 1 299 528 C | 4/1992 |
| FR | 2 845 678 A1 | 4/2004 |

(Continued)

OTHER PUBLICATIONS

Extended European Search Report issued Aug. 12, 2014 in the corresponding EP Patent Application 11 82 1231.

*Primary Examiner* — Michael Mansen
*Assistant Examiner* — Michael Riegelman
(74) *Attorney, Agent, or Firm* — Carrier Blackman & Associates, P.C.; Joseph P. Carrier; Anne G. Sabourin (57) ABSTRACT

A mast assembly for a forklift truck includes a plurality of guide units. At least one of the guide units includes a sliding pad member made of a plastic material and having a block-shaped body, which is hollow, is open at its base side, and has a rectangular ring-shaped cross section. The sliding pad member has a rectangular, plain, front wall provided at the side of the block-shaped body opposite to the base side thereof. The front wall has a sliding contact surface. Reinforcement ribs are formed on the inner surface of the front wall. Grooves are formed in the sliding contact surface, extending along the respective ones of the reinforcement ribs and helping avoid formation of shrinkage depressions in the sliding contact surface. The block-shaped body includes first and second pairs of opposing side walls. Tabs are formed on the first pair of opposing side walls.

5 Claims, 7 Drawing Sheets

(56) References Cited

U.S. PATENT DOCUMENTS

| | | | |
|---|---|---|---|
| 3,961,689 A * | 6/1976 | Leskovec | 187/226 |
| 4,155,428 A * | 5/1979 | Hansen | 187/230 |
| 5,199,533 A * | 4/1993 | Wilke | 187/244 |
| 7,398,859 B2 * | 7/2008 | Lewis et al. | 187/226 |
| 2004/0251085 A1 * | 12/2004 | Kuwano | 187/226 |

FOREIGN PATENT DOCUMENTS

| | | |
|---|---|---|
| GB | 857 604 A | 1/1961 |
| JP | S50-12856 Y1 | 4/1975 |
| JP | S58-72252 U | 5/1983 |
| JP | 3-232698 A | 10/1991 |
| JP | 5-64188 U | 8/1993 |
| JP | 9-201841 A | 8/1997 |
| JP | 2001-140278 A | 5/2001 |
| JP | 2005-194007 A | 7/2005 |
| JP | 2010-052867 A | 3/2010 |
| KR | 200 159 156 Y1 | 10/1999 |

\* cited by examiner

MAST ASSEMBLY FOR FORKLIFT TRUCK

TECHNICAL FIELD

The present invention relates to a mast assembly for a forklift truck, i.e., an assembly mounted upright on the front of the truck frame of a forklift truck and supporting loading forks for elevational movement.

BACKGROUND OF THE INVENTION

There are known various types of forklift trucks. A forklift truck is used to lift and transport materials with a pair of elevationally movable forks for loading and unloading tasks. Typically, the forklift truck has a mast assembly mounted upright on the front of the truck frame and supporting loading forks for elevational movement (See, for example, Patent Publication No. 1 cited below).

The known mast assembly disclosed in Patent Publication No. 1 includes an outer mast having a pair of right and left uprights mounted upright on the front of the truck frame, an inner mast having a pair of right and left uprights each slidably fitted in the corresponding one of the pair of uprights of the outer mast and elevationally movable by means of a lift cylinder, and a carriage assembly slidably fitted in the pair of uprights of the inner mast and elevationally movable by means of the lift cylinder. The carriage assembly is provided with a pair of object carrying forks mounted thereon.

This type of a mast assembly includes guide units disposed between each upright of the outer mast and the corresponding upright of the inner mast, as well as between each upright of the inner mast and the carriage assembly. By virtue of these guide units, the sliding movement of the uprights of the inner mast relative to the uprights of the outer mast, as well as the sliding movement of the carriage assembly relative to the uprights of the inner mast can be caused smoothly by the lift cylinder. Conventionally, various roller guide units are used for such guide units. In other words, various roller guide units have been used in order to guide the inner mast and the carriage assembly for elevational movement. There have been many prior art documents which show such roller guide units in detail (See, for example, Patent Publication No. 2 cited below).

Patent Publication No. 1: Published Japanese Patent Application No. 2005-194007.

Patent Publication No. 2: Published Japanese Patent Application No. Hei-03-232698 (No. 1991-232698).

SUMMARY OF THE INVENTION

Problems to be Solved by the Invention

The known roller guide unit for use in a forklift truck as disclosed in Patent Publication No. 2 includes a roller shaft, a guide roller rotatably supported on the roller shaft by means of a bearing, and brackets for supporting the ends of the roller shaft so as to set the guide roller in position. Such a roller guide unit, however, is costly, and the setting of such a roller guide unit in place as well as the replacement of any damaged roller guide unit with a new one are cumbersome and time consuming processes. Furthermore, as the guide rollers are typically made of quenched steel, loud clatters tend to be generated when the guide rollers strike against the corresponding guide surfaces during running of the forklift track, so that the operator of the forklift truck is often annoyed by uncomfortable noises and/or vibrations. In addition, in order to avoid interference of the guide rollers of such roller guide units with the uprights of the masts or the carriage assembly on which the roller guide units are set in place, certain features, such as recesses and/or protrusions, have to be formed in/on the uprights of the masts or the carriage assembly, which however necessitates additional costs.

In view of the foregoing, it is an object of the present invention to provide an improved mast assembly for a forklift truck, with which the setting of the guide units in place on the uprights of the outer mast, on the uprights of the inner mast, and/or on the bracket plates of the carriage assembly can be achieved in an easy and convenient manner, the replacement of any damaged guide unit with a new one can be achieved also in an easy and convenient manner, the cost of the guide unit itself can be reduced, and further, any noises and vibrations generated by the guide unit can be reduced.

Resolution

The above object is achieved by a mast assembly for a forklift truck in accordance with the present invention, which comprises: an outer mast including a pair of right and left uprights each mounted upright on the front of the truck frame of the forklift truck and each having inner guide surfaces; an inner mast including a pair of right and left uprights each received in the corresponding one of said pair of right and left uprights of said outer mast for elevational movement and each having inner guide surfaces and outer guide surfaces; a carriage assembly having a pair of right and left bracket plates each received in the corresponding one of said pair of right and left uprights of said inner mast for elevational movement; a first guide unit fixed onto said inner guide surfaces of each said upright of said outer mast and being in contact with said outer guide surfaces of the corresponding said upright of said inner mast so as to guide said inner mast for elevational movement; a second guide unit fixed onto said outer guide surfaces of each said upright of said inner mast and being in contact with said inner guide surfaces of the corresponding said upright of said outer mast so as to guide said inner mast for elevational movement; and a third guide unit fixed onto each said bracket plate and being in contact with said inner guide surfaces of the corresponding said upright of said inner mast so as to guide said carriage assembly for elevational movement; wherein at least one of said first, second, and third guide units comprises a sliding pad member made of a plastic material.

Advantages Provided by the Invention

With such a mast assembly for a forklift truck in accordance with the present invention, at least one of the guide units, which are disposed either between each upright of the outer mast and the corresponding upright of the inner mast or between each upright of the inner mast and the corresponding bracket plate of the carriage assembly, comprises a sliding pad member made of a plastic material. By virtue of this, the setting of the guide units in place on the uprights of the outer mast, on the uprights of the inner mast, and/or on the bracket plates of the carriage assembly can be achieved in an easy and convenient manner, the replacement of any damaged guide unit with a new one can be achieved also in an easy and convenient manner, the cost of the guide unit itself can be reduced, and further, any noises and vibrations generated by the guide unit can be reduced.

EXEMPLARY MODE FOR CARRYING OUT THE INVENTION

Referring now to FIGS. 1 to 6, an exemplary embodiment of a mast assembly constructed in accordance with the present invention as well as a forklift truck using the same will be described in detail.

Figure 1:
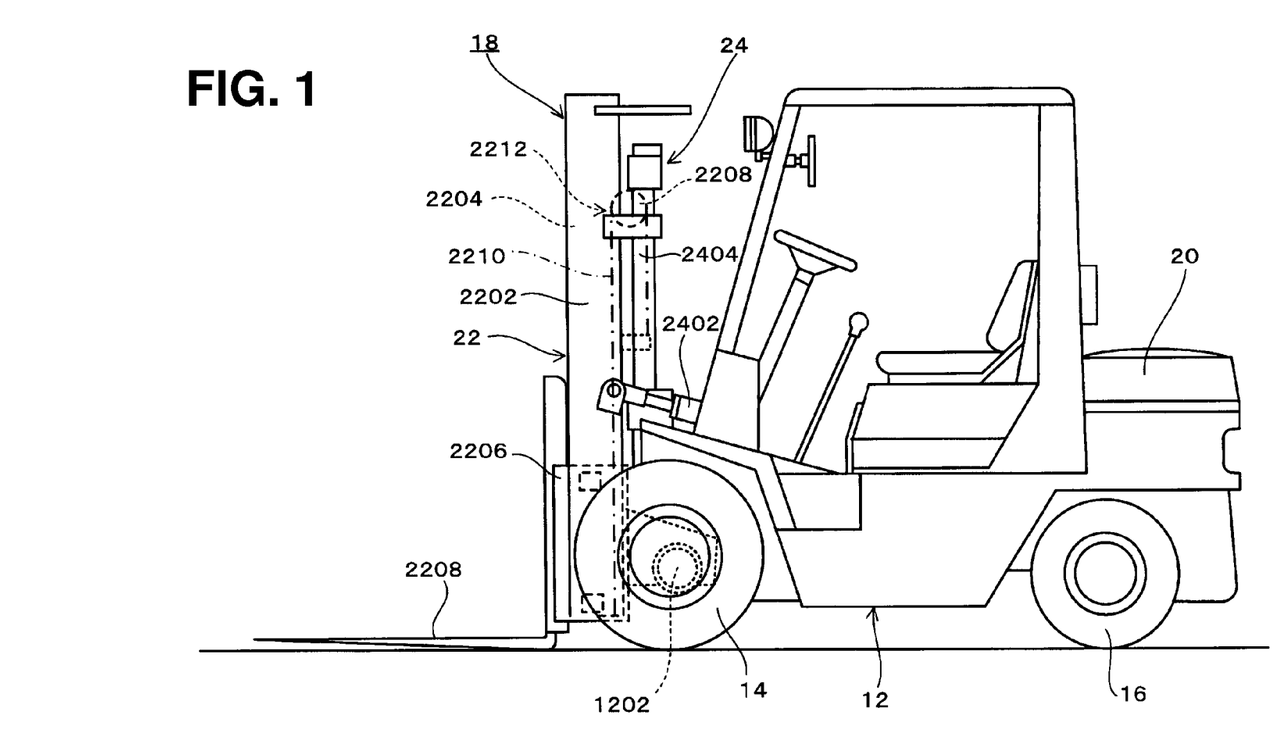
FIG. 1 is a side elevational view of a forklift truck provided with a mast assembly in accordance with the present invention.
Figure 2:
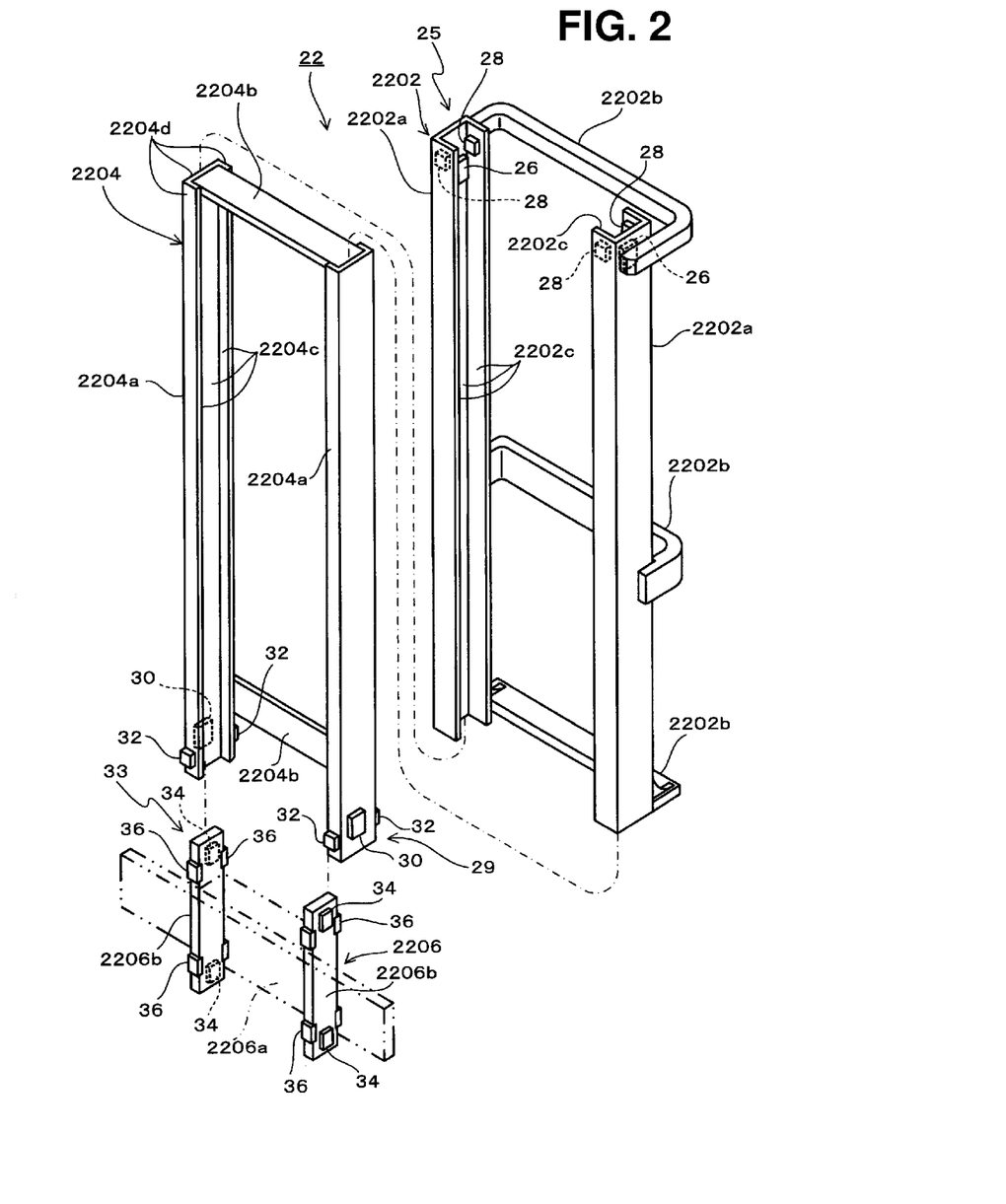
FIG. 2 is an enlarged exploded view of the mast assembly in accordance with the present invention.

As shown in FIGS. 1 and 2, a forklift truck includes a truck frame 12, a pair of front steering wheels 14 mounted on the front of the truck frame 12, and a pair of rear driving wheels 16 mounted on the rear of the truck frame 12. The forklift truck also includes a loading device 18 mounted on the front of the truck frame 12 and a counterweight 20 attached to the rear of the truck frame 12.

The loading device 18 includes a mast assembly 22 and a mast assembly driving unit 24 for driving the mast assembly 22.

The mast assembly 22 includes an outer mast 2202 mounted on the front of the truck frame 12. The truck frame 12 has a bracket 1202, to which the lower end of the outer mast 2202 is pivotably connected for rearward tilt movement from the vertical position by a certain angle. The mast assembly 22 also has an inner mast 2204 received by the outer mast 2202 for elevational movement along the latter, as well as a carriage assembly 2206 received by the inner mast 2204 for elevational movement along the latter. The carriage assembly 2206 is provided with a pair of object carrying forks 2208.

The mast assembly driving unit 24 includes a tilt cylinder 2402 disposed between the front of the truck frame 12 and the outer mast 2202 for causing tilt movement of the mast assembly 22, a lift cylinder 2404 mounted on the rear of the outer mast 2202 and extending upright for causing elevational movement of the inner mast 2204, and a drive train 2212 for causing elevational movement of the carriage assembly 2204 via the inner mast 2204. The drive train 2212 includes a lift sprocket 2208 and a lift chain 2210 wrapped around the lift sprocket 2208.

The outer mast 2202, as shown in FIG. 2, includes a pair of right and left uprights 2202a and a plurality of cross members 2202b interconnecting the pair of uprights 2202a at their upper ends, lower ends, and intermediate points, respectively, such that the outer mast 2202 is formed as an upright, elongated, rectangular frame. The pair of uprights 2202a are made from U-channel steel beam and have their open sides facing to each other. Each of the pair of uprights 2202a has three, plain, inner surfaces 2202c defining the inside of the U-channel steel beam. The inner surfaces serve as inner guide surfaces 2202c of each upright 2202a.

The inner mast 2204, as shown in FIG. 2, includes a pair of right and left uprights 2204a and a plurality of cross members 2204b interconnecting the pair of uprights 2204a at their upper ends and lower ends, respectively, such that the inner mast 2204 is formed as an upright, elongated, rectangular frame. The pair of uprights 2204a are made from U-channel steel beam and have their open sides facing to each other. Each of the pair of uprights 2204a has three, plain, inner surfaces 2204c defining the inside of the U-channel steel beam. The inner surfaces serve as inner guide surfaces 2204c of each upright 2204a. Further, each of the pair of uprights 2204a has three, plain, outer surfaces 2204d defining the outside of the U-channel steel beam. The outer surfaces serve as outer guide surfaces 2204d of each upright 2204a.

The pair of right and left uprights 2204a of the inner mast 2204 are received in the pair of right and left uprights 2202a of the outer mast 2202, respectively, such that the uprights 2204a of the inner mast 2204 are capable of elevational sliding movement relative to and along the uprights 2202a of the outer mast 2202.

The carriage assembly 2206 includes a horizontally-extending, elongated, carriage frame 2206a and a pair of right and left bracket plates 2206b fixed to the carriage frame 2206a. The pair of bracket plates 2206 are spaced apart a distance corresponding to the spacing between the pair of uprights 2204a of the inner mast 2204, are elongated in shape, and extend upright and parallel to each other.

The pair of right and left bracket plates 2206b of the carriage assembly 2206 are received in the pair of right and left uprights 2204a of the inner mast 2204, respectively, such that the bracket plates 2206b of the carriage assembly 2206 are capable of elevational sliding movement relative to and along the uprights 2204a of the inner mast 2204.

Figure 3:
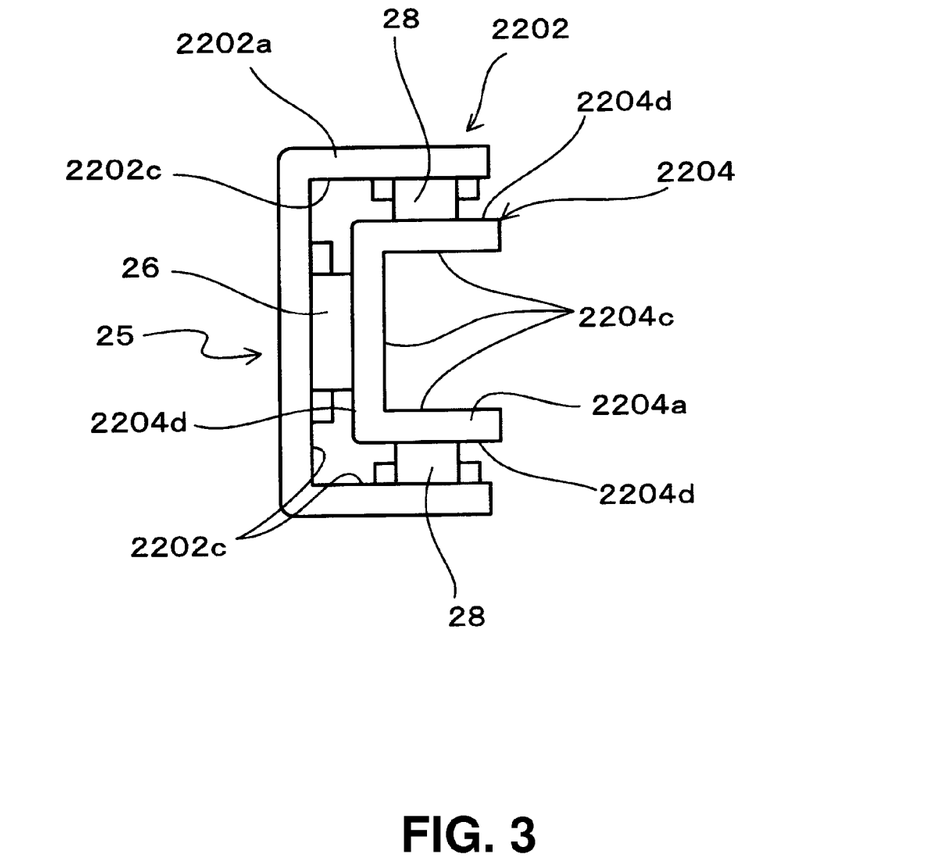
FIG. 3 shows an arrangement of sliding pad members disposed in the gap defined between each upright of the outer mast and the corresponding upright of the inner mast, forming a part of the mast assembly in accordance with the present invention.
Figure 5:
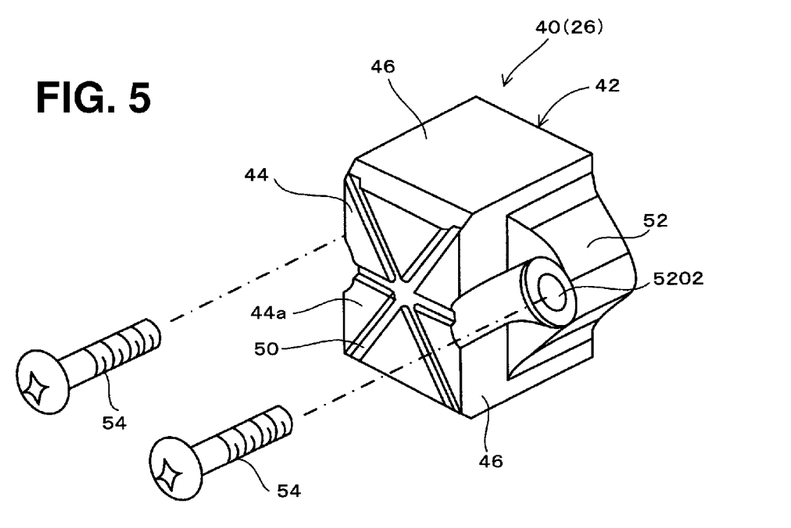
FIG. 5 is an enlarged perspective view of the sliding pad member forming a part of the guide unit used in the mast assembly in accordance with the present invention, as viewed obliquely from the front side.

As shown in FIGS. 2 and 3, each upright 2202a of the outer mast 2202 is provided, in its upper end region, with a first set of three guide members 26, 28, 28, which are directly fixed onto the three inner guide surfaces 2202c of the upright 2202a, respectively, by means of appropriate securing means, such as screws 54 as shown in FIG. 5. For the purpose, though not shown in the drawings, the inner guide surfaces 2202c of the upright 2202a of the outer mast 2202 have threaded holes formed therein for receiving the screws 54. The first set of three guide members 26, 28, 28 are in contact with the three outer guide surfaces 2204d of the corresponding upright 2204a of the inner mast 2204, respectively, so as to participate in the guiding of the inner mast 2204 for elevational movement.

Thus, the three guide members 26, 28, 28 in the first set together form a first guide unit 25, which is fixed onto the set of three inner guide surfaces 2202c of each upright 2202a of the outer mast 2202 and is in contact with the set of three outer guide surfaces 2404d of the corresponding upright 2204a of the inner mast 2204, so as to participate in the guiding of the inner mast 2204 for elevational movement.

Figure 4:
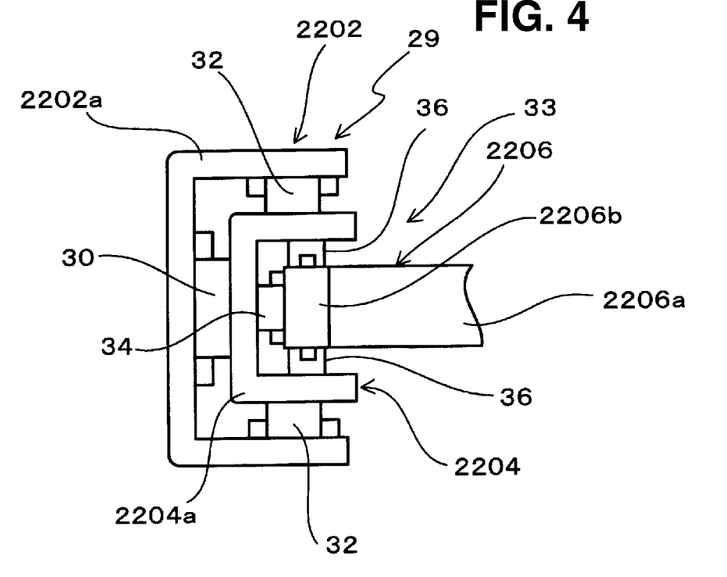
FIG. 4 shows an arrangement of the guide units disposed in the gap defined between each upright of the outer mast and the corresponding upright of the inner mast as well as in the gap defined between each upright of the inner mast and the corresponding bracket plate, forming a part of the mast assembly in accordance with the present invention.

As shown in FIGS. 2 and 4, each upright 2204a of the inner mast 2204 is provided, in its lower end region, with a second set of three guide members 30, 32, 32, which are directly fixed onto the three outer guide surfaces 2204c of the upright 2204a, respectively, by means of appropriate securing means, such as screws 54 as shown in FIG. 5. For the purpose, though not shown in the drawings, the outer guide surfaces 2204c of the upright 2204a of the inner mast 2204 have threaded holes formed therein for receiving the screws 54. The second set of three guide members 30, 32, 32 are in contact with the three inner guide surfaces 2202c of the corresponding upright 2202a of the outer mast 2202, respectively, so as to participate in the guiding of the inner mast 2204 for elevational movement.

Thus, the three guide members 30, 32, 32 in the second set together form a second guide unit 29, which is fixed onto the set of three outer guide surfaces 2204c of each upright 2204a of the inner mast 2204 and is in contact with the set of three inner guide surfaces 2202c of the corresponding upright 2202a of the outer mast 2202, so as to participate in the guiding of the inner mast 2204 for elevational movement.

Also as shown FIGS. 2 and 4, each bracket plate 2206b of the carriage assembly 2206 is provided, in each of its upper and lower end regions, with a third set of three guide members 34, 36, 36, which are directly fixed onto the bracket plate 2206b by means of appropriate securing means, such as screws 54 as shown in FIG. 5. For the purpose, though not shown in the drawings, the bracket plate 2206b has threaded holes formed therein for receiving the screws 54. The third set of three guide members 34, 36, 36 are in contact with the three inner guide surfaces 2204c of the corresponding upright 2204a of the inner mast 2204, respectively, of the corresponding one of the pair of uprights 2204a of the inner mast 2204, so as to participate in the guiding of the carriage assembly 2206 for elevational movement.

Thus, the three guide members 34, 36, 36 in the third set together form a third guide unit 33, which is fixed onto either end of each bracket plate 2206b of the carriage assembly 2206 and is in contact with the set of three inner guide surfaces 2204c of the corresponding upright 2204a of the inner mast 2204, so as to participate in the guiding of the carriage assembly 2206 for elevational movement.

Next, the structure of the guide members 26, 28, 28, 30, 32, 32, 34, 36 and 36 in the first, second, and third sets will be discussed in detail. With the embodiment shown in the drawings, the guide members in the first, second, and third sets each comprises a sliding pad member made of a plastic material, such as a plastic sliding pad member 40 shown in FIGS. 5 to 9. Although the guide members used in the embodiment are different in size and proportion depending on their fixing places (they may be fixed onto various guide surfaces including those of the outer mast, the inner mast and the carriage assembly), the sliding pad member 40 may be used for any of the guide members after appropriate modifications in size and/or proportion are effected thereto. The sliding pad member 40 shown in FIGS. 5 to 9 and described hereinafter has its size and proportion adapted for use as the guide member 26 in the first set.

The sliding pad member 40 (or the guide member 26) is made of a plastic material. Preferred plastic materials for the sliding pad member 40 include, but not limited to, glass fiber reinforced Nylon 6 with any appropriate filler (such as molybdenum disulfide powder) added thereto, MC Nylon ("MC Nylon" is a registered trademark) with any appropriate lubricant (such as any suitable wax or PTFE (polytetrafluoroethylene) powder) added thereto, and any of high wear-resistant plastics (such as PEEK (polyetheretherketone), aramid resins, or phenol resins) with or without any appropriate lubricant and/or any appropriate reinforcement (such as glass fibers or carbon fibers) added thereto. The sliding pad member 40 may be made of any of these materials and formed by molding as a one-piece element.

As shown in FIGS. 5 to 9, the sliding pad member 40 has a generally-cubic, block-shaped body 42, which is hollow, has a generally uniform wall thickness, is open at its base side (which is the side to be fixed onto the corresponding fixing surface), and has a rectangular ring-shaped cross section.

The sliding pad member 40 has a rectangular, plain, front wall 44 provided at the side of the block-shaped body 42 opposite to the base side thereof. The front wall 44 has an outer surface defining a sliding contact surface 44a, which is to be in sliding contact with one of the guide surfaces of the uprights 2202a of the outer mast 2202 and the uprights 2204a of the inner mast 2204.

The sliding pad member 40 also has a pair of reinforcement ribs 48 formed on the inner surface of the front wall 44 for reinforcing the sliding contact surface 44a. The pair of reinforcement ribs 48 extend along the respective ones of the pair of diagonal lines of the rectangular sliding contact surface 44a so as to cross each other at the center of the latter. The sliding pad member 40 also has a pair of grooves 50 formed in the sliding contact surface 44a. The pair of grooves 50 extend along the respective ones of the pair of reinforcement ribs 48 and help avoid formation of shrinkage depressions in the sliding contact surface 44a.

The block-shaped body 42 of the sliding pad member 40 includes a first pair of opposing side walls 46 and a second pair of opposing side walls 46, while the sliding pad member 40 has a pair of tabs 52 each formed on the corresponding one of the first pair of opposing side walls 46. Each tab 52 has a through hole 5202 for receiving the screw 54 for fixing the sliding pad member 40 onto the uprights 2202a of the outer mast 2202, the uprights 2204a of the inner mast 2204, or the bracket plates 2206b of the carriage assembly 2206. The above described grooves 50 formed in the sliding contact surface 44a serve as lubricant holding grooves for holding therein a grease or other suitable lubricant.

Figure 6:
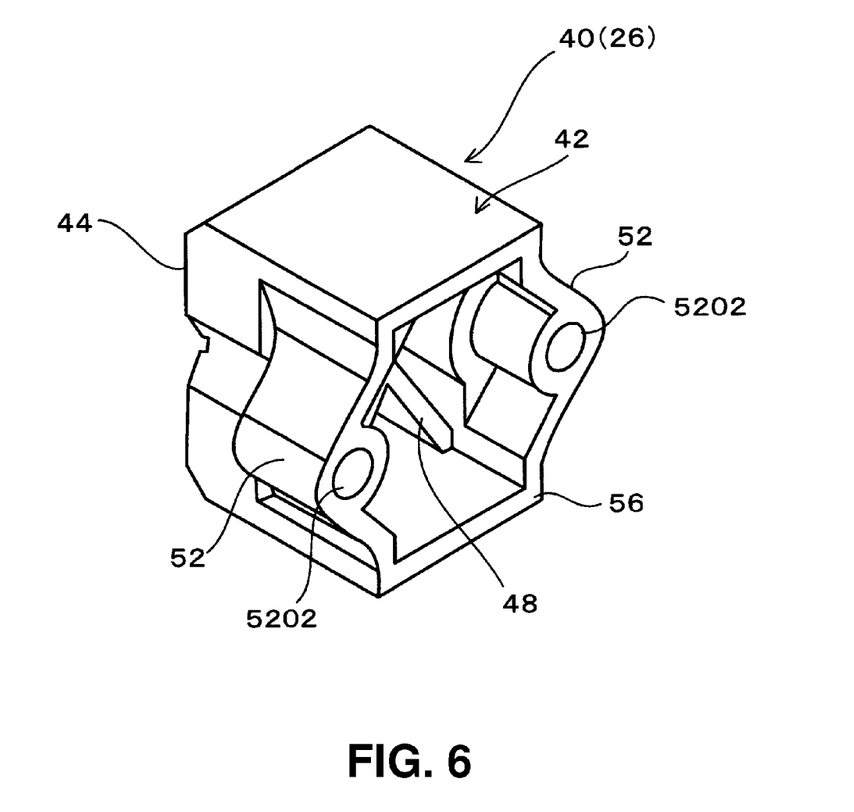
FIG. 6 is an enlarged perspective view of the sliding pad member forming a part of the guide unit used in the mast assembly in accordance with the present invention, as viewed obliquely from the rear side.
Figure 8:
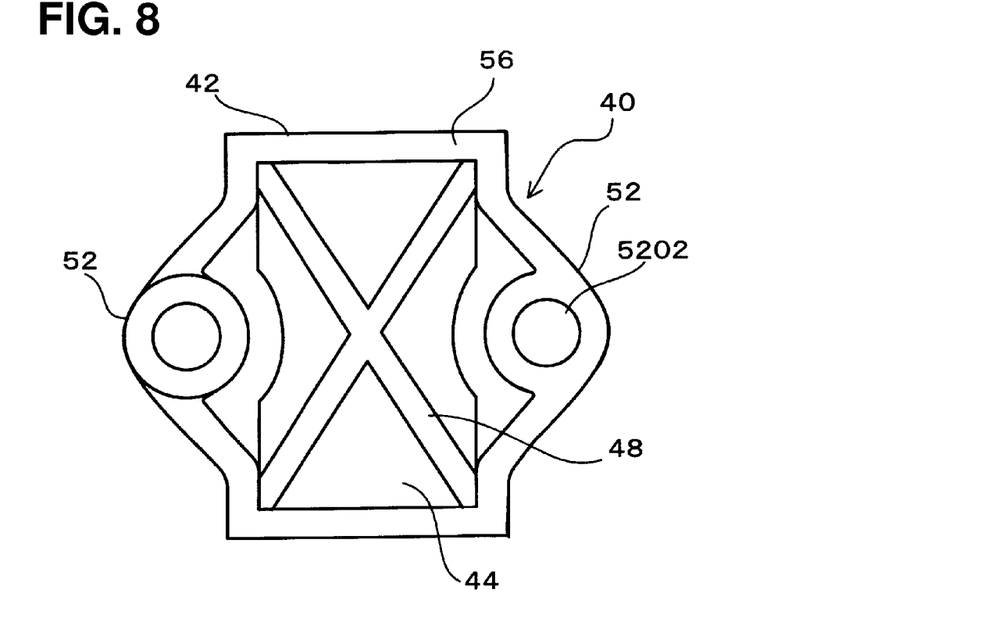
FIG. 8 is a rear view of the sliding pad member forming a part of the guide unit of FIG. 5, as viewed from the side opposite to the side of its sliding contact surface.
Figure 9:
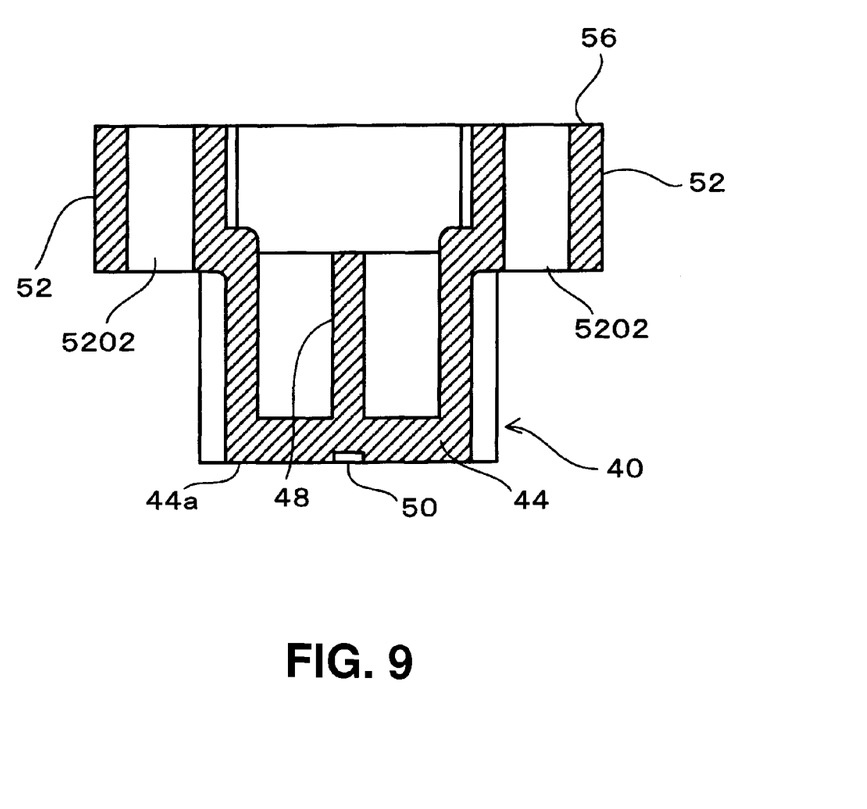
FIG. 9 is a cross sectional view taken along line A-A of FIG. 7.

The sliding pad member 40 has a single, rectangular ring-shaped, plain surface 56 extending along the entire periphery of the base side of the block-shaped body 42. The plain surface 56 is adapted to be in secure contact with the corresponding fixing surface, which is one of the inner guide surfaces of the uprights of the outer mast, the outer guide surfaces of the uprights of the inner mast, and the surfaces of the bracket plates of the carriage assembly.

During the use of the forklift truck for loading and unloading tasks, the inner mast 2204 is moved elevationally by the operation of the lift cylinder 2404 while the carriage assembly 2206 is moved elevationally through the drive train 2212. With respect to the movement of the inner mast 2204, the pair of uprights 2204a of the inner mast 24 are guided for elevational movement within the pair of uprights 2202a of the outer mast 2202, with the first sets of guide members 26, 28, 28 being in sliding contact with the outer guide surfaces 2204d of the pair of uprights 2204a of the inner mast 2204, as well as with the second sets of the guide members 30, 32, 32 being in sliding contact with the inner guide surfaces 2202c of the pair of uprights 2202a of the outer mast 2202. With respect to the movement of the carriage assembly 2206, the pair of bracket plates 2206b are guided for elevational movement within the pair of uprights 2204a of the inner mast 2204, with the third sets of guide members 34, 36, 36 being in sliding contact with the inner guide surfaces 2204c of the pair of uprights 2204a of the inner mast 2204.

According to the above described embodiment, the first and second guide units 25, 29 (which are disposed between each upright 2202a of the outer mast 2202 and the corresponding upright 2204a of the inner masts 2204), as well as the third guide unit 33 (which is disposed between each upright 2204a of the inner mast 2204 and the corresponding bracket plate 2206b of the carriage assembly 2206), each comprises the set of sliding pad members 40 made of a plastic material and formed by molding. With this arrangement, the setting of the sliding pad members 40 in place on the uprights 2202a of the outer mast 2202, on the uprights 2204a of the inner mast 2204, and on the bracket plates 2206b of the carriage assembly 2206 can be achieved in an easy and convenient manner, and the replacement of any damaged sliding pad member 40 with a new one can be achieved also in an easy and convenient manner. Further, with this arrangement, the costs of the first to third guide units 25, 29, 33 can be reduced, and any uncomfortable striking noises and vibrations which may be generated during elevational movement of the carriage assembly 2206 or during running of the forklift truck can be reduced.

Also according to the above described embodiment, the plastic sliding pad members 40 in the first to third guide units 25, 29, 33 each has the pair of tabs 52 formed on the first pair of opposing side walls 46 of the block-shaped body 42, by means of which the sliding pad member 40 is fixed onto the corresponding fixing surface. By virtue of the provision of these tabs 52, the sliding pad member 40 can be disposed in place while it occupies only a small rectangular area and provides a sufficient fixing strength, and further, the sliding pad member 40 can be securely fixed onto the corresponding fixing surface in an easy and convenient manner while the head of the fixing screw 54 can be kept at a level lower than that of the sliding contact surface 44a.

Also according to the above described embodiment, the plastic sliding pad member 40 has the pair of reinforcement ribs 48 formed on the inner surface of the front wall 44 for reinforcing the sliding contact surface 44a. By virtue of this, the durability of the first to third guide units 25, 29, 33 formed by the sets of plastic sliding pad members 40 can be advantageously increased.

Figure 7:
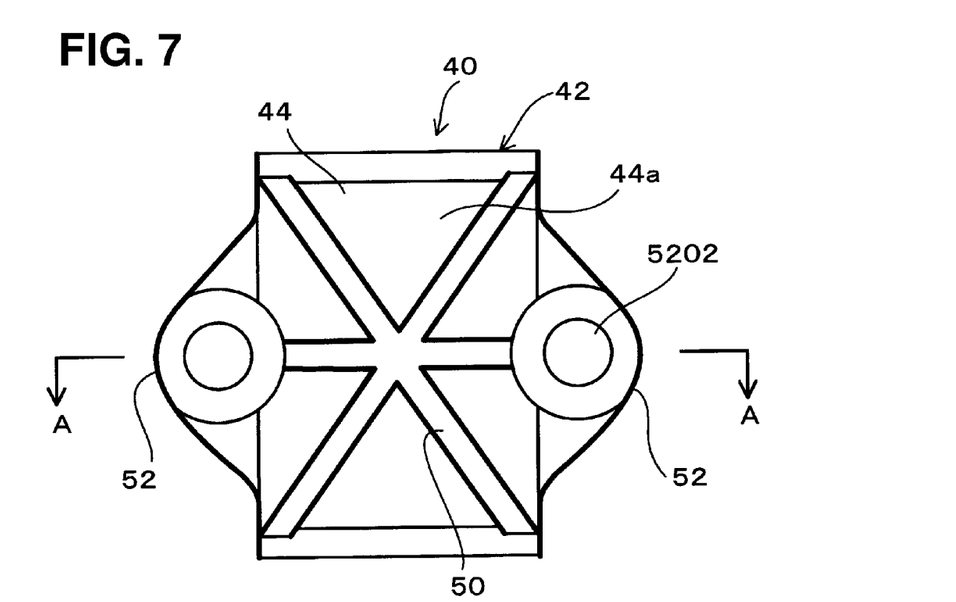
FIG. 7 is a front view of the sliding pad member forming a part of the guide unit of FIG. 5, as viewed from the side of its sliding contact surface.

Further, the sliding pad member 40 has the pair of grooves 50 formed in the sliding contact surface 44a, which extend along the respective ones of the pair of reinforcement ribs 48 and help avoid formation of shrinkage depressions on the sliding contact surface 44a. By virtue of this, the durability of the sliding pad members 40 in the first to third guide units 25, 29, 33, can be ensured while its product quality can be advantageously improved.

Furthermore, the sliding pad member 40 has the single, rectangular ring-shaped, plain surface 56 extending along the entire periphery of the base side of the block-shaped body 42. By virtue of this, any load applied on the sliding pad member 40 can be securely supported thereby while the durability of the sliding pad member 40 can be advantageously improved.

The present invention is not limited to the use of the specific form of plastic sliding pad member 40 as shown and explained in detail above, but rather, various forms of plastic sliding pad members may be used without departing from the scope of the present invention as claimed. Further, the number of the plastic sliding pad members 40 in each of the first to third guide units 25, 29, 33, as attached to each upright of the outer mast, each upright of the inner mast, or either end of each bracket plate, is not limited to that shown above, but rather, other numbers of plastic sliding pad members 40 may be used in each of the first to third guide units 25, 29, 33 without departing from the scope of the present invention as claimed.

With the embodiment described above, any one of the first, second, and third guide units 25, 29, 33 is formed exclusively from the plastic sliding pad members 40. Nevertheless, this embodiment may be modified into various other forms. For example, as one possible modification, among the three plastic sliding pad members 34, 36, 36 in the third guide unit 33, the two as designated by reference numerals 36, 36 may be replaced with any conventional guide rollers, and further, all of the three plastic sliding pad members 26, 28, 28 in the first guide unit 25 and all of the three plastic sliding pad members 30, 32, 32 in the second guide unit 29 may be replaced with any conventional guide rollers (i.e., only one of the plastic sliding pad members 40, the one designated by reference numeral 34 in the third guide unit 33, will remain after this modification). Even with such modified embodiment, noises and vibrations can be advantageously reduced. As an alternative modification, among the three plastic sliding pad members 34, 36, 36 in the third guide unit 33, the one as designated by reference numeral 34 may be replaced with any conventional guide roller, and further, all of the three plastic sliding pad members 26, 28, 28 in the first guide unit 25 and all of the three plastic sliding pad members 30, 32, 32 in the second guide unit 29 may be replaced with any conventional guide rollers (i.e., only two of the plastic sliding pad members, the ones as designated by reference numerals 36, 36 in the third guide unit 33, will remain after this modification). Even with such modified embodiment, noises and vibrations can be advantageously reduced. Alternatively, a similar modification (i.e., the replacement of all the plastic sliding pad members 40 with any conventional guide rollers except for only one or two plastic sliding pad member(s) in a certain guide unit) may be made, in which the plastic sliding pad member(s) to remain after the modification is/are selected from the first guide unit 25 or the second guide unit 29. Even such modified embodiments can provide the advantage of reducing noises and vibrations.

LIST OF REFERENCE NUMERALS 12 truck frame
18 loading device
22 mast assembly
2202 outer mast
2202a upright of the outer mast
2202c inner guide surface
2204 inner mast
2204a upright of the inner mast
2204c inner guide surface
2204d outer guide surface
2206 carriage assembly
2206a carriage frame
2206b bracket plate of the carriage assembly
24 mast assembly driving unit
25 first guide unit
26, 28 guide members in the first set
29 second guide unit
30, 32 guide members in the second set
33 third guide unit
34, 36 guide members in the third set
40 sliding pad member
42 block-shaped body
44 front wall
44a sliding contact surface
48 reinforcement rib
50 groove
52 tab

What is claimed is:

1. A mast assembly for a forklift truck, comprising:
an outer mast including a pair of right and left uprights each mounted upright on the front of a truck frame of the forklift truck and each having inner guide surfaces;
an inner mast including a pair of right and left uprights each received in the corresponding one of said pair of right and left uprights of said outer mast for elevational movement and each having inner guide surfaces and outer guide surfaces;
a carriage assembly having a pair of right and left bracket plates each received in the corresponding one of said pair of right and left uprights of said inner mast for elevational movement;
a first guide unit fixed onto said inner guide surfaces of each said upright of said outer mast and being in contact with said outer guide surfaces of the corresponding said upright of said inner mast so as to guide said inner mast for elevational movement;
a second guide unit fixed onto said outer guide surfaces of each said upright of said inner mast and being in contact with said inner guide surfaces of the corresponding said upright of said outer mast so as to guide said inner mast for elevational movement; and
a third guide unit fixed onto each said bracket plate and being in contact with said inner guide surfaces of the corresponding said upright of said inner mast so as to guide said carriage assembly for elevational movement;
wherein at least one of said first, second, and third guide units comprises a sliding pad member made of a plastic material, and said sliding pad has a hollow, block-shaped body, which is open at its base side, said block-shaped body including a rectangular plain front wall provided opposite to said base side, and a first pair of opposing side walls and a second pair of opposing side walls; and
the front wall has an inner surface and an outer surface, the outer surface defining a sliding contact surface which is in sliding contact with one of said outer guide surfaces of said pair of uprights of said inner mast, said inner guide surfaces of said pair of uprights of said outer mast, and said inner guide surfaces of said pair of uprights of said inner mast;
and the sliding pad member further includes a pair of reinforcement ribs formed on the inner surface of said front wall and extending along diagonal lines of the rectangular sliding surface and crossing at the center of the rectangular sliding surface, and
the block shaped body includes a pair of ring-shaped tabs, where one tab is formed within each wall of the first set of opposing side walls of said block-shaped body, said tabs each having a through hole for receiving a screw for fixing said block-shaped body onto one of said inner guide surfaces of said pair of uprights of said outer mast, said outer guide surfaces of said pair of uprights of said inner mast, and the surfaces of said pair of bracket plates, and the head of the fixing screw is at a level lower than that of the sliding contact surface.

2. A mast assembly for a forklift truck according to claim 1, wherein:
said sliding pad member comprises a pair of grooves formed in said sliding contact surface for holding therein a lubricant.

3. A mast assembly for a forklift truck according to claim 2, wherein:
said sliding pad member has a single, plain surface extending along the entire periphery of a base side of said block-shaped body, which is adapted to be in secure contact with one of said inner guide surfaces of said pair of uprights of said outer mast and the surfaces of said pair of bracket plates.

4. A mast assembly for a forklift truck according to claim 1, wherein:
said sliding pad member has a single, plain surface extending along the entire periphery of a base side of said block-shaped body, which is adapted to be in secure contact with one of said inner guide surfaces of said pair of uprights of said outer mast and the surfaces of said pair of bracket plates.

5. A mast assembly for a forklift truck, comprising:
an outer mast including a pair of right and left uprights each mounted upright on the front of a truck frame of the forklift truck and each having inner guide surfaces;
an inner mast including a pair of right and left uprights each received in the corresponding one of said pair of right and left uprights of said outer mast for elevational movement and each having inner guide surfaces and outer guide surfaces;
a carriage assembly having a pair of right and left bracket plates each received in the corresponding one of said pair of right and left uprights of said inner mast for elevational movement;
a first guide unit fixed onto said inner guide surfaces of each said upright of said outer mast and being in contact with said outer guide surfaces of the corresponding said upright of said inner mast so as to guide said inner mast for elevational movement;
a second guide unit fixed onto said outer guide surfaces of each said upright of said inner mast and being in contact with said inner guide surfaces of the corresponding said upright of said outer mast so as to guide said inner mast for elevational movement; and
a third guide unit fixed onto each said bracket plate and being in contact with said inner guide surfaces of the corresponding said upright of said inner mast so as to guide said carriage assembly for elevational movement;
wherein at least one of said first, second, and third guide units comprises a sliding pad member made of a plastic material, and said sliding pad has a hollow, block-shaped body, which is open at its base side, said block-shaped body having a rectangular shaped cross section and includes a first pair of opposing side walls and a second pair of opposing side walls, a plain front wall which is provided at the side of said block-shaped body opposite to said base side, and the sliding pad has an outer surface defining a rectangular sliding contact surface, which is to be in sliding contact with one of said outer guide surfaces of said pair of uprights of said inner mast, said inner guide surfaces of said pair of uprights of said outer mast, and said inner guide surfaces of said pair of uprights of said inner mast; and
the sliding pad member further includes a pair of reinforcement ribs formed on an inner surface of said front wall and extending along diagonal lines of the rectangular sliding surface and crossing at the center of the rectangular sliding surface; and
the sliding pad further includes a pair of grooves for holding lubricant formed in the sliding contact surface and extending along the pair of reinforcement ribs; and
and the sliding pad member further includes a pair of ring-shaped tabs, each tab having a through hole, and one tab is formed within each wall of the first set of opposing side walls of said block-shaped body for fixing said block-shaped body, by means of a screw, onto one of said inner guide surfaces of said pair of uprights of said outer mast, said outer guide surfaces of said pair of uprights of said inner mast, and the surfaces of said pair of bracket plates and the head of the fixing screw is at a level lower than that of the sliding contact surface.

* * * * *